United States Patent
Cortes et al.

(10) Patent No.: US 9,043,243 B2
(45) Date of Patent: May 26, 2015

(54) SYSTEM AND METHOD OF GENERATING A MEDIA PACKAGE FOR INGESTING INTO AN ON-LINE DOWNLOADING APPLICATION

(75) Inventors: Ricardo Cortes, Los Gatos, CA (US); Max Muller, III, San Jose, CA (US); Jason Fosback, Edmonds, WA (US)

(73) Assignee: Apple Inc., Cupertino, CA (US)

( * ) Notice: Subject to any disclaimer, the term of this patent is extended or adjusted under 35 U.S.C. 154(b) by 1484 days.

(21) Appl. No.: 12/131,515

(22) Filed: Jun. 2, 2008

(65) Prior Publication Data
US 2009/0297126 A1  Dec. 3, 2009

(51) Int. Cl.
- G06Q 99/00 (2006.01)
- H04N 7/173 (2011.01)
- H04N 21/2343 (2011.01)
- H04N 21/239 (2011.01)
- H04N 21/472 (2011.01)
- H04N 21/61 (2011.01)
- H04N 21/6379 (2011.01)
- H04N 21/854 (2011.01)
- G06Q 50/18 (2012.01)

(52) U.S. Cl.
CPC ....... *H04N 7/17336* (2013.01); *G06Q 2220/10* (2013.01); *G06Q 2220/18* (2013.01); *G06Q 50/18* (2013.01); *H04N 21/234336* (2013.01); *H04N 21/2393* (2013.01); *H04N 21/47202* (2013.01); *H04N 21/6125* (2013.01); *H04N 21/6175* (2013.01); *H04N 21/6379* (2013.01); *H04N 21/85406* (2013.01)

(58) Field of Classification Search
CPC  G06Q 50/18; G06Q 2220/10; G06Q 2220/18
USPC ........................................ 705/50, 51, 59, 310
See application file for complete search history.

(56) References Cited

U.S. PATENT DOCUMENTS

| | | | | |
|---|---|---|---|---|
| 5,892,900 A | * | 4/1999 | Ginter et al. | 726/26 |
| 6,496,802 B1 | * | 12/2002 | van Zoest et al. | 705/14.73 |
| 6,609,105 B2 | * | 8/2003 | Van Zoest et al. | 705/14.47 |
| 7,409,145 B2 | * | 8/2008 | Antoun et al. | 386/248 |
| 2006/0041503 A1 | * | 2/2006 | Blair et al. | 705/37 |
| 2008/0120196 A1 | * | 5/2008 | Reed et al. | 705/26 |
| 2009/0286560 A1 | * | 11/2009 | Willis | 455/466 |

* cited by examiner

Primary Examiner — James D Nigh
(74) Attorney, Agent, or Firm — Novak Druce Connolly Bove + Quigg LLP

(57) ABSTRACT

A system and method of delivering a media package to an on-line downloading store are disclosed. The method includes receiving a media file into a compressor application in which at least one compression job is assigned for the media file. The method further includes receiving setting data and destination data for storing a media package associated with processing the media file. The method next includes retrieving pre-defined asset metadata based on user-submitted credential data and vendor identification data, receiving contract acceptance data based on a pre-existing contract associated with the media file and generating a media package configured for ingestion into the on-line media store for each at least one compression job assigned to the media file.

20 Claims, 9 Drawing Sheets

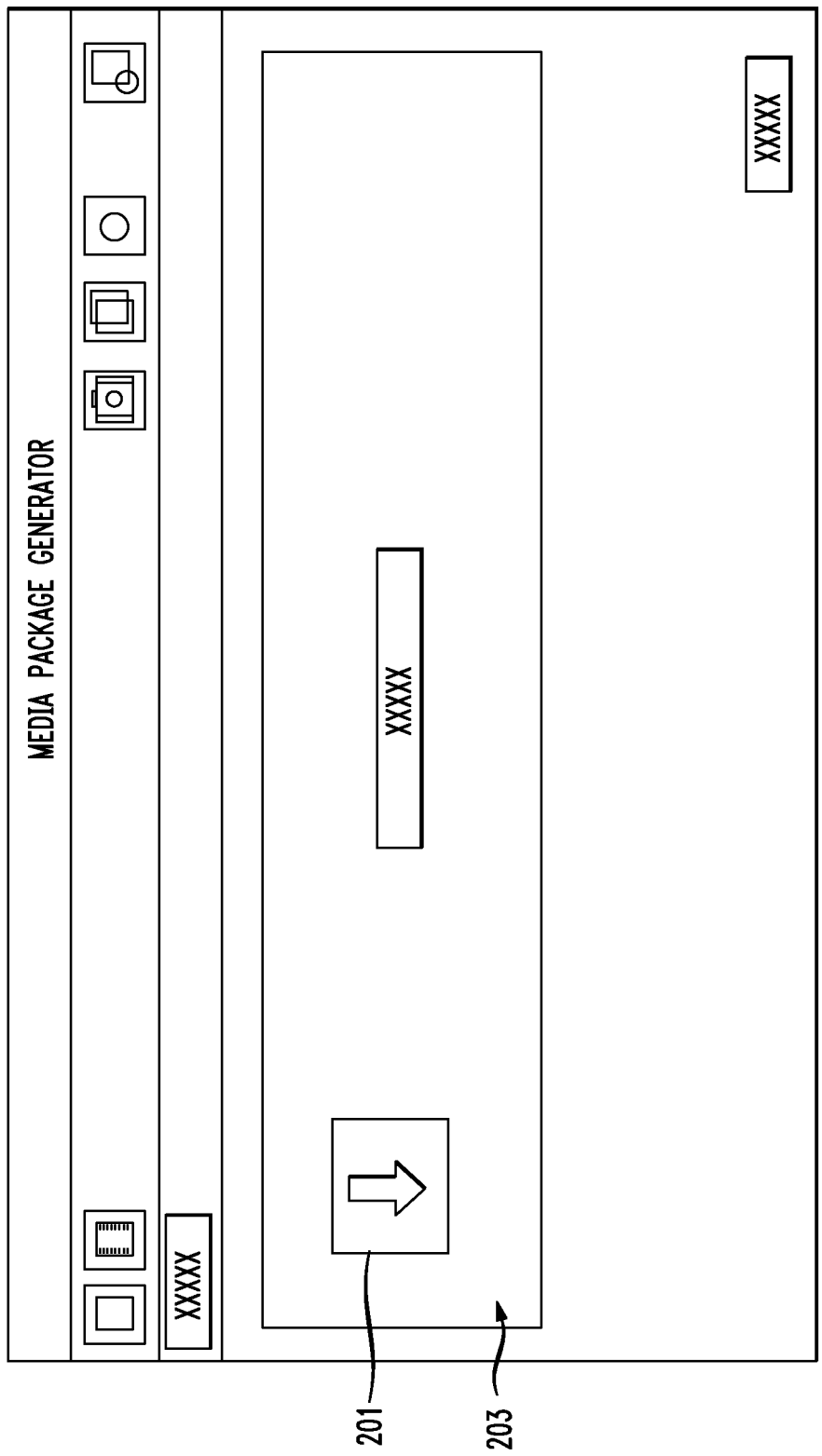

FIG. 3

Inspector

301 — Name: Untitled iTunes Store Delivery

303 — Description: No description

Encoder

305 — File Format: iTunes Store Delivery

307 — Extension: itmsp  ☑ Allow Job Segmenting

Options — 313

File Extension itmsp
Estimated file size unknown
iTunes Store Delivery
    Upload To Apple: No
Audio Encoder
    Format: Audio
    Sample Rate: auto
    Channels: Audio
    Sample Rate: auto
    Channels: Automatic
    Bits Per Sample: 0
Video Encoder
    Format: Video
    Width – 100
    Height – 100
    Pixel aspect ratio: Default
    Crop: None
    Padding: none Revert  Save 311    309

FIG. 4

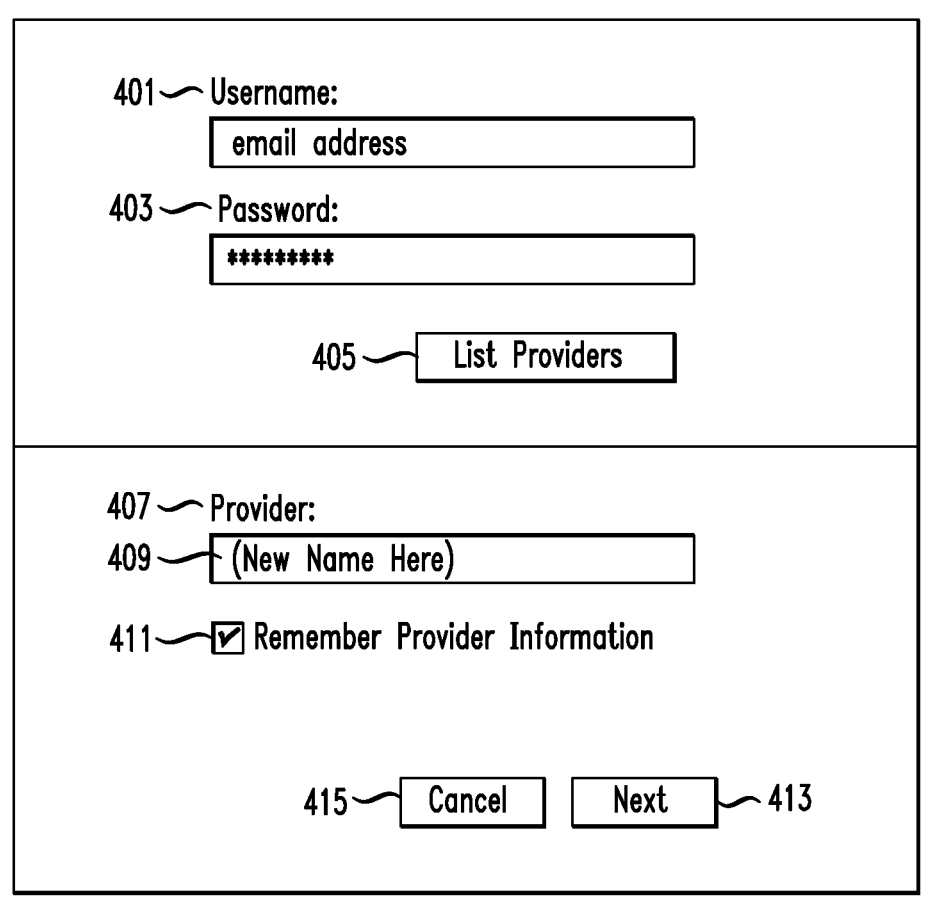

401 — Username:
[email address]

403 — Password:
[********]

405 — [List Providers]

407 — Provider:
409 — [(New Name Here)]

411 — ☑ Remember Provider Information

415 — [Cancel]   [Next] — 413

*FIG. 6*

601 — Username: test@apple.com

603 — Provider: Viacom

605 — ☑ Upload to On-Line Store

Check the box above to automatically send your assets to the On-Line Store when the job is successfully completed.

607 Cancel    609 Previous    611 Next

SYSTEM AND METHOD OF GENERATING A MEDIA PACKAGE FOR INGESTING INTO AN ON-LINE DOWNLOADING APPLICATION

RELATED APPLICATIONS

The invention relates to generating media packages, and more particularly to a system and method of generating media packages configured for ingesting into an on-line downloading store.

BACKGROUND OF THE INVENTION

With the development of the internet, on-line downloading stores or applications have become very popular. These stores allow consumers with internet access to purchase and download authorized digital copies of media files. Examples of media files that can be downloaded upon purchase include, for example, TV shows, movies, music, games and computer applications. These media files available for purchase can be downloaded and played on personal computers, portable media players, smart phones, cell phones, televisions, television media players, video game devices and other electronic devices. These on-line downloading stores are popular with consumers because they allow a consumer to conveniently download the desired content whenever they are connected to the internet. Generally, consumers desire an on-line downloading server with a very large selection of media available for download. Content creators typically upload or digitally send their media to on-line stores to make them available for purchase. This process can be complicated and time consuming inasmuch as there are many parameters and criteria that need to be met for proper ingestion of the media into the on-line stores.

Although large corporate media content creators typically have dedicated teams and resources to deliver content that meets an on-line downloading store's submission criteria, independent media content creators often lack such resources. Therefore, what is needed is a method and apparatus for generating a media package configured to be ingested into an on-line downloading store that can be operated in a simple manner by any type of media content creator.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

This invention disclosure describes a method and apparatus for generating a media package configured for ingesting in an on-line media store. Disclosed are systems, methods and computer readable media for receiving data and a media file and generating a media package configured for ingestion into an on-line media store such as iTunes from Apple, Inc.

The method embodiment is illustrative of the invention and the principles associated with the method are applicable and to the system and computer readable medium embodiments. A method of delivering a media package to an on-line downloading store is disclosed. The method includes receiving a media file into a compressor application in which at least one compression job is assigned for the media file, receiving setting data and destination data for storing a media package associated with processing the media file, retrieving pre-defined asset metadata based on user-submitted credential data and vendor identification data, receiving contract acceptance data based on a pre-existing contract associated with the media file and generating a media package configured for ingesting into the on-line media store for each at least one compression job assigned to the media file. The compressor module or application may be, for example, the Compressor tool provided by Apple, Inc., or any other compression application that performs the function of receiving media content and provide a convenient mechanism to choose various compression settings and output formats. Therefore, the term "compressor application" or module generally refers to either Apple's Compressor tool or a similar compression application that performs audio and/or video encoding.

One context in which the invention may apply is as a plug-in to a compressor application. As is known in the art, Apple, Inc. provides a compressor application that enables users to convert one or more source media files into one or more different media file output formats. Using the compressor application, a media file, in fairly simple manner, can be converted to H.264 and MP3 (for output devices such as an iPod or Apple TV), MPEG-4 or Quicktime (for a broadband and lowband streaming using Quicktime), MPEG-1, MPEG-2, AIFF for DVD video or AIFF, MP3 or Quicktime for CD-ROM. This is not an exhaustive list. Other standard based compression algorithms may be used as well. In one aspect, the method and concepts disclosed herein may be added as an additional feature to the compression application as discussed above such the user can convert media to one or more particular formats and create an additional job that generates a media package in a particular format such as iTMSP (an iTunes Store package) with any additional metadata files such as a metadata.xml file or a chapters.xml file.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 2 illustrates an example window that receives a media file into a compressor application;

FIG. 3 illustrates an example window for receiving setting data and destination data;

FIG. 4 illustrates an example window for receiving user-submitted credential data;

FIG. 6 illustrates an example window for a selection that causes the transfer of one more media packages to the on-line store automatically upon generation;

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
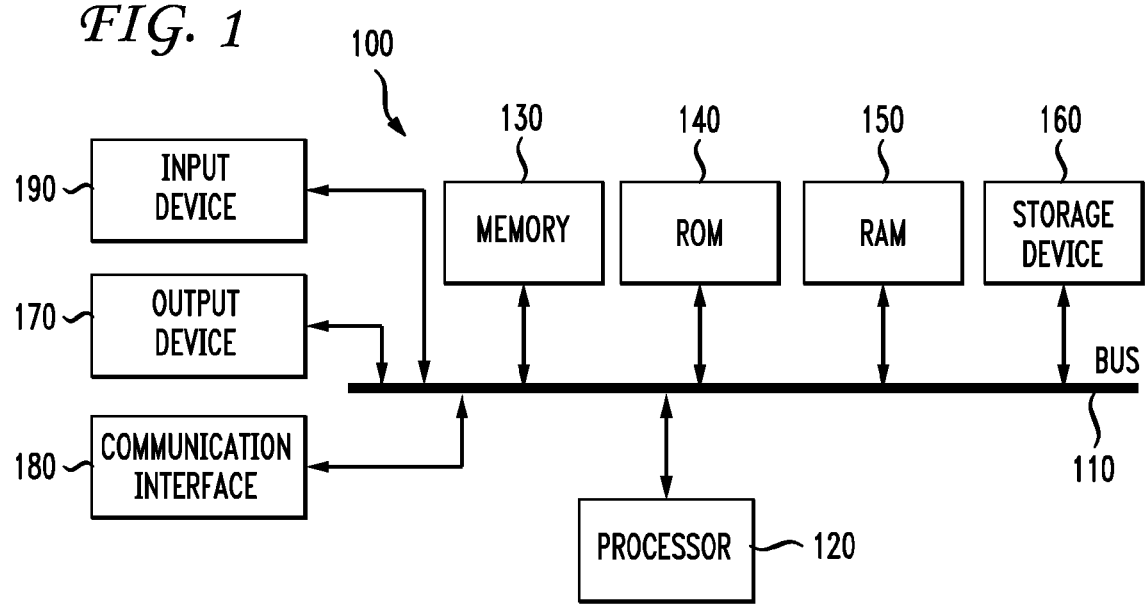
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

As noted above, the present invention enables the generation of media packages for smaller, more independent entities such as film companies or individuals to easily submit media content to an on-line distribution application or store such as iTunes from Apple, Inc. Any on-line distribution facility that receives media with metadata in a certain required format is contemplated as within the scope of this disclosure.

Currently, as is known in the art, those entities submitting content to iTunes will utilize an application called iTunes Store Transporter to deliver the content that they have preassembled. The transporter is shown by way of illustration as feature 913 in FIG. 9. The content delivered through such an application as the transporter 913 must be pre-generated. Because it is difficult for smaller entities without sufficient expertise or staff to process the media content for submission through the transporter 913 (or similar application), the present inventors created a feature to facilitate the delivery of media content. Although it is not a specific requirement of this disclosure, preferably, the application disclosed herein can be used as a plug-in or additional feature set within the compression application 901. In other words, this disclosure covers an application that acts as a bridge between the compressor application 901 and the on-line store 915. The media package generator 903 generates a package configured and acceptable for ingestion into the on-line store 918 and preferably includes a metadata XML file and a chapters XML file and delivers that package to the appropriate servers for ingestion. Discussed below are various windows demonstrating user interaction with the media package generator 903 that enable the system to receive the necessary data and confirm that the media is confirmed for processing.

FIG. 2 illustrates an initial user interaction in providing a media file to a compressor application 901. As noted above, the context of the media package generator 903 is within a compressor application 901 that receives a media file and converts the file into one or more formats configured for a particular viewing device. As shown in the example embodiment of FIG. 2, a media file 201 is dragged in a graphical environment to receiving window 203. The media file is typically video and audio data associated with a movie. The media file may only be audio as well or other combinations of data. In this example, the dragging of the media file 201 to the receiving window 203 causes the compressor application 901 to begin to process the media file in which at least one compression job is assigned for the media file. The media file may have multiple compression jobs assigned to the media file.

For example, if multiple viewing devices are to display the media file, the compressor application enables the user to convert the media file in one batch into multiple formats for the various devices. This media file may have multiple compression jobs assigned to the media file, so that the media file is compressed into a separate format according to each job. This would allow the movie media file to be compressed into multiple files, each with a format for standard-definition television, high-definition television, portable media players, smart phones, cell phones, and the like.

FIG. 3 illustrates an additional interface built into the compressor application 901. This interface enables the system to interact with the user and other databases to process the media file, not just generally for compression into a format like H.264, but for generating the media package configured for ingestion into the on-line store 915. As shown in FIG. 3, the user provides setting data and destination data for storing a media package associated with processing the media file. The user submits a name 301 and description 303 for the particular job. The user designates a file format 305 which in this case an option is added to the compressor application 901 to select delivery to the on-line store with the appropriate extension 307. The extension shown in FIG. 3 is the "itmsp" which is an example extension for an on-line store package including a metadata.xml file and a chapters.xml file. The itmsp file extension is a sample file format or "package" containing the transcoded media plus metadata such as chapters.xml and/or metadata.xml. The exemplary itmsp file format may be an archive format operating without compression, such as a .tar file in a Unix system, or operating with any previously known or yet to be developed compression scheme, such as a .lzma or .gz file in a Unix system. The extension itmsp is provided as an illustration; other file extensions and/or formats may be used. Different file formats may be specified for each target of a given job. This example also contains buttons to save 309 or revert 311 the current job.

An options button 313 enables the user to submit further data and the results are shown in a window 315. Window 315 illustrates the selected data, including the file extension, whether the user has selected to "upload to Apple: No" and audio encoder and video encoder data. In this example, if the user selects not to "upload to Apple (or any other on-line store provider)", then the system will store the media package locally or at a temporary location. For example, the generated package may be stored on a local hard drive and upon the next synchronization with the on-line store, the system delivers the package at that time. The user may select an option to immediately upload to the on-line store without the local intermediate storage. Delayed package delivery allows for packages of television shows, for example, to be generated in advance of a general broadcast so the television show can be made available for purchase immediately following the broadcast.

As shown in FIG. 4, part of the process includes the user providing a user name 401 and a password 403. Typically, the user will be associated with a pre-approved list of providers 405. Example providers include Viacom or Disney. Therefore, the user selects from the list of providers 405 the appropriate provider. For a new provider 406, the system enables the user to input a new provider name 409 and remember the provider information 411. This example also contains buttons to advance to the next step 413 or cancel 415.

In one aspect associated with FIG. 4, the username, password and selected provider name cause the system to communicate with a database, such as with the transporter 913, to confirm this data. The system has stored a listing of providers for which the user is authorized to deliver content. The system confirms that the user is authorized for the selected provider prior to processing the media package. In one aspect, once the username and password are verified, the system presents a list of authorized providers for which they can submit content. Clicking the "next" button brings the user to FIG. 5.

Figure 5:
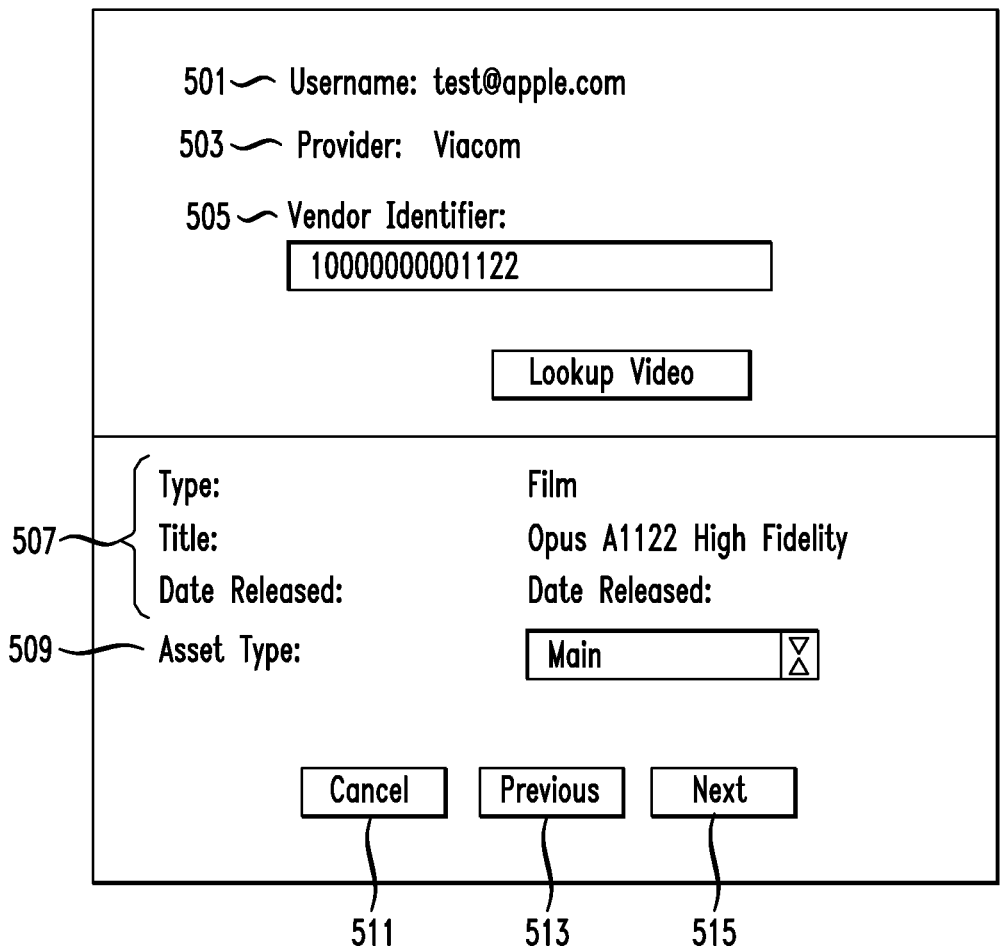
FIG. 5 illustrates an example window for retrieving pre-defined asset metadata based on user-submitted credential data and vendor identification data.

As shown in the example embodiment of FIG. 5, the system retrieves pre-defined asset metadata based on user-submitted credential data and vendor identification data. Pre-defined asset metadata may include at least one of: XML information, chapter information, chapter heading information, chapter break information, and pricing information. This window receives the username 501, content provider 503, and vendor identifier 505 from a lookup in a database. The window shows metadata 507, (indicating in this embodiment type, title, date released, and if applicable asset type). Additionally, a designation for choosing between multiple asset types is presented if multiple assets formats exist for the type of media. For example, if the media is a TV episode, then the system will not present an asset type pulldown because there is only one format or asset type for a TV episode. For a movie, the system presents an asset type pulldown 509 because the asset may be the main movie, or may be a trailer for the movie. This basically means that the user has in advance pre-arranged and has been approved to submit a certain movie for a certain provider. The system does need to know if what is being submitted is the trailer or the main movie. When the user inputs that detail for the media, an <asset_type> element is generated when generating the XML medatadata for the media package. This example also contains buttons to advance to the next step 515, previous step 513, or cancel 511. For course, for other types of assets, such as for TV episodes, the metadata would be different and configured for the data necessary for TV episodes.

The user or submitter of media content has previously entered into a contract that also spells out requirements and limitations on what media files that user can submit and other parameters. Part of this process involves the application to access a database to review and confirm that contract terms are complied with such that the final ingested media file into the on-line store is clean both technically and contractually with the various requirements.

FIG. 6 illustrates an example window that enables the user to designate whether to automatically generate and upload the media package to the on-line store. If so, then the media package generator 903 generates the package and transmits it for ingestion. The window of FIG. 6 also illustrates the username 601, provider 603, and designation box 605. This example also contains buttons to complete the process 611, go to a previous step 609, or cancel 607.

Figure 7:
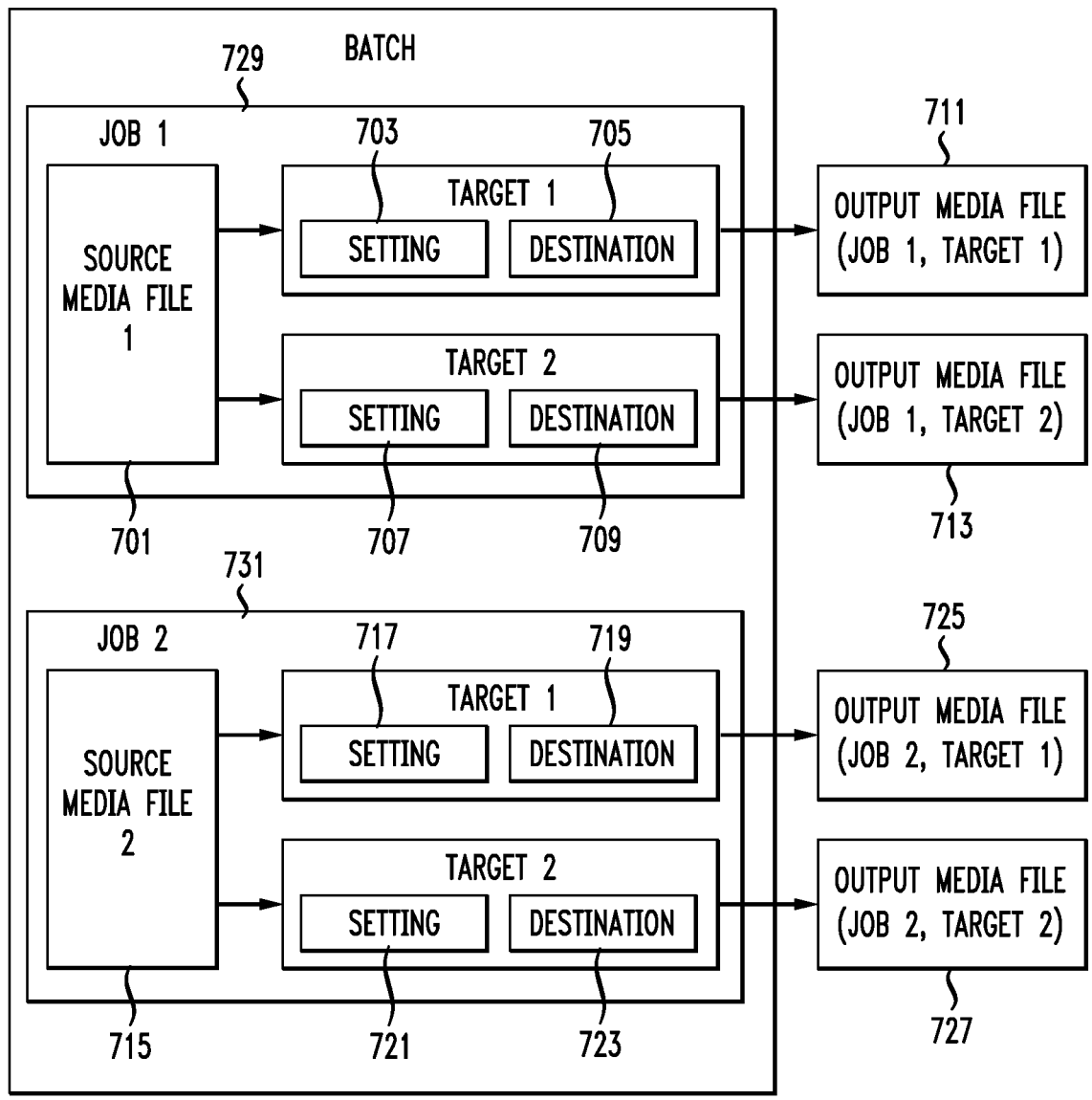
FIG. 7 illustrates an example window of a batch containing two media files, wherein each is a job containing two targets.

FIG. 7 illustrates the processing of a batch containing two media files. This figure illustrates generally how the jobs are processed within the compressor application 901. Each media file is assigned a job containing two targets. For example, the first media file 701 is assigned job 1. Job 1 729 contains two targets—target 1 and target 2. Target 1 includes settings 703 and a destination 705. Target 2 includes its settings 707 and destination 709. The settings are a combination of transcode attributes, such as output format, filter, and geometry settings, which are applied to the source media file during the transcoding process. These settings are illustrates as features 917 in FIG. 9. For example, the user may select filters that adjust the different characteristics of the video. Color, brightness, sharpness and so forth may be selected to improve the video quality as it is compressed or processed. The user can crop the image or video and adjust its frame size. There may also be action settings such as sending an email notification and executing post-transcoding tasks using scripts. One sample post-transcoding task is generating chapters to provide media consumers with easier navigation through video content. One of the settings options that apply to the present disclosure in a compressor application 901 is the option to select an output file format relates to ingestion into the on-line store. In other words, in addition to H.264, MPEG-4 and the like as selectable formats, the system presents the user with the ability to choose a source media file with an output format configured for on-line store delivery. Multiple transcoding settings for a particular media format may be selected. For example, a high quality setting and a low quality setting may be used to generate output files of the same format but for different purposes.

Individual targets for a job may specify different package formats for the output media file. One example given is the .itmsp file extension package format. For example, suppose output media file for Job 1, Target 1 711 is in .itmsp format and output media file for Job 1, Target 2 713 is in .7z format. The associated metadata and chapter files in each package are essentially the same, the only difference being that they are stored in a slightly different way. Of course, the output media files in each package are necessarily different because they were transcoded with different settings for different output tasks.

A first output media file 711 is generated from the target 1 processing and a second output media file 713 is generated for target 2. Furthermore in this example, the second media file 715 is assigned job 2. Job 2 731 contains two targets for converting source media file 2 715. Target 1 has its settings 717 and destination 719 and target 2 includes its settings 721 and destination 723. A third output media file 725 and fourth output media file 727 is created for each respective target. Each target includes setting and destination data for defining the format of the respective media file and destination for storing the respective media file. Thus, the transcoded media files created after the batch is submitted and processed are called output media files. An output media file is the result of a successfully transcoded source media file containing a setting and destination. A person can create as many output media files as there are different settings applied to the various source media files in the batch. Thus, the user can select various transcoding of the source file into various formats in the compressor application 901 and then append to that chain of jobs an additional job of generating an output file for ingestion into the on-line store as part of that batch. This is a capability not previously available.

Figure 8:
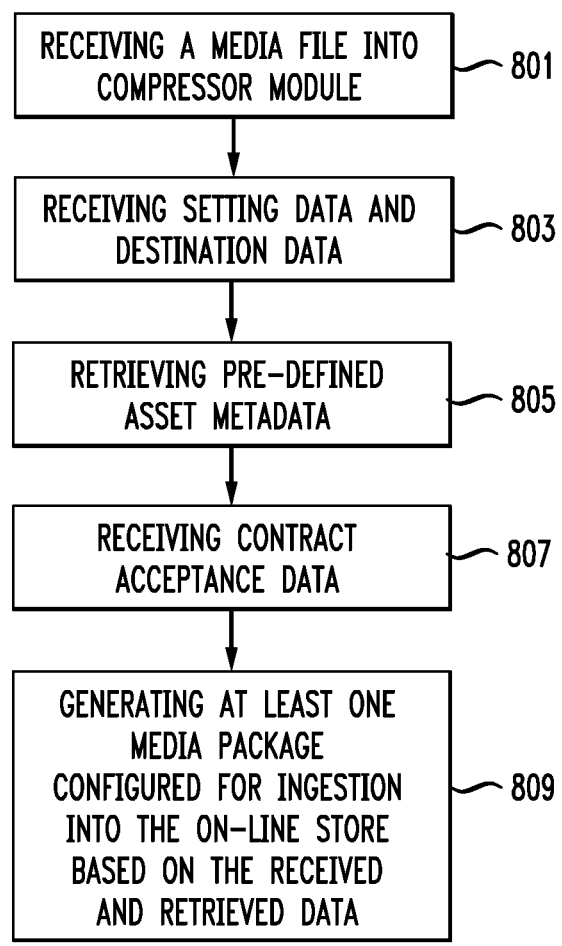
FIG. 8 illustrates an example method embodiment for generating a media package configured for ingesting into the on-line store.

As shown in the embodiment of FIG. 8, the method includes receiving a media file into a compressor application in which at least one compression job is assigned for the media file (801). The system receives setting data and destination data for storing a media package associated with processing the media file (803). As noted above, if the user requests that they media file does not get uploaded to the on-line store, the system will store the output media file at the destination. If the user requests an immediate upload, then the system may ignore the designated destination and begin the upload immediately or may temporarily store the output media file while it is being uploaded. The system retrieves pre-defined asset metadata based on user-submitted credential data and vendor identification data (805) and receives contract acceptance data based on a pre-existing contract associated with the media file (807). Contract negotiation can be an important part of the digital media distribution process. In this embodiment, by only accepting media packages from media content creators that have accepted various contract terms, the on-line store can be more certain that the contractual rights of all parties are firmly established for the digital media prior to distribution. The final step in the method is generating at least one media package configured for ingesting into the on-line media store for each at least one compression job assigned to the media file based on the received and retrieved data (809). Although this illustrative embodiment contains steps in a particular order, other orders of the steps as will be appreciated by one of ordinary skill in the art may be utilized to achieve the same result.

Figure 9:
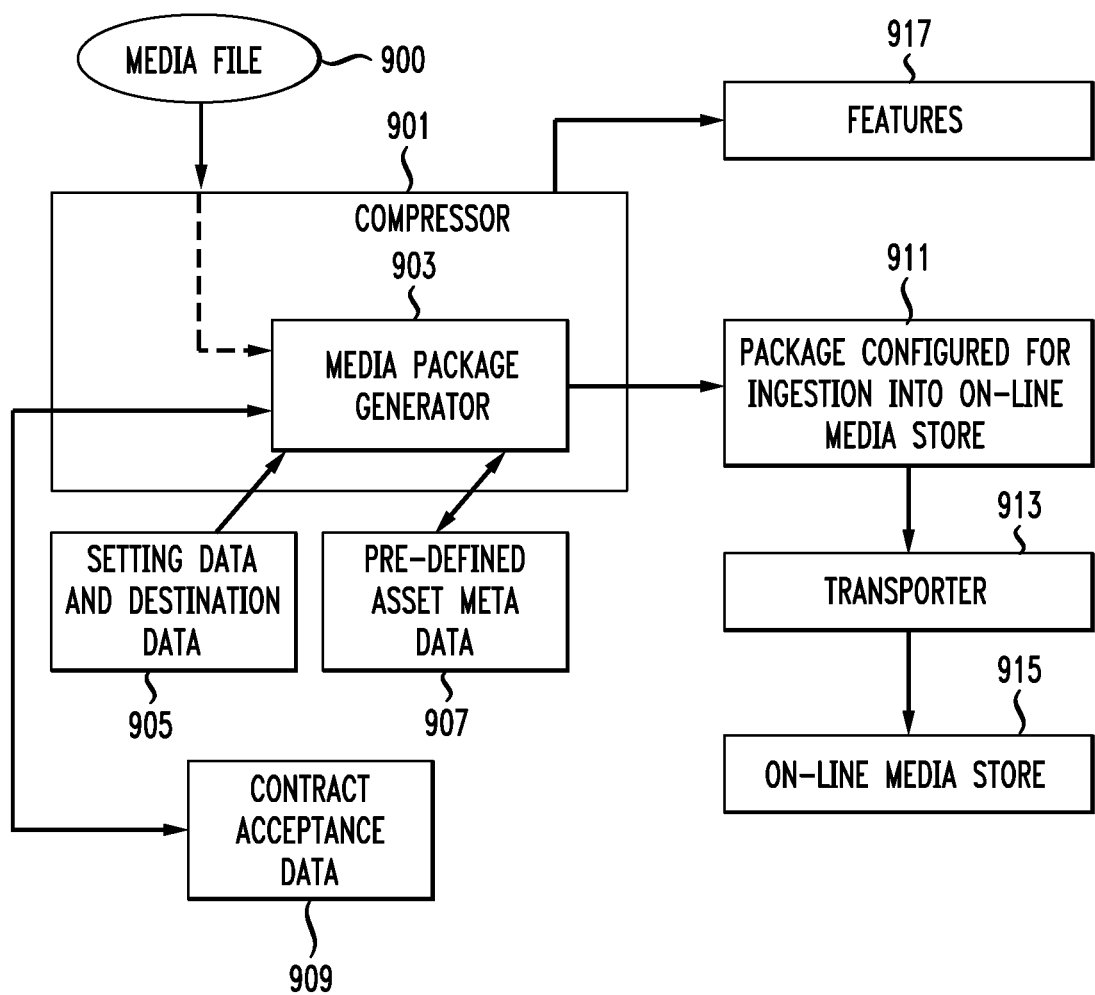
FIG. 9 illustrates an example module in the context of a compressor application for accepting a media file and generating a media package configured for ingesting into the on-line store.

FIG. 9 has been referred to several times above. This figures shows the general functional blocks associated with the inclusion of a media package generator 903 associated with a compressor application 901. A user submits a media file 900 to the compressor application 901. Module 901 may be the Compressor provided by Apple or may be any other compression application. The media package generator 903 communicates with the user and receives setting data and destination data 905. In one aspect, the media package generator 903 is the Xpander application from Apple. The media package generator 903 also retrieves pre-defined asset metadata 907 based on user-submitted credential data and vendor identification data. The media package generator 903 receives contract acceptance data based on a pre-existing contract associated with the media file. The media package generator 903 then generates at least one media package 911 configured for ingestion into the on-line media store for each at least one compression job assigned to the media file 900. The at least one media package 911 can be processed for ingestion in any number of ways. One example is through Apple's Transporter application 913. The transporter module 913 processes the package and sends the at least one media package to the on-line media store.

Other implementations may be utilized wherein media files and media packages that are not in a correct format are rejected before reaching the on-line media store 915. This rejection can happen at any point in the distribution before the package reaches the on-line store. For instance, rejection can occur as a media file is submitted to the compressor application 901 because it does not comply with contract acceptance data 909 or rejection can occur during transcoding because the media file does not transcode properly and identifies an error. This embodiment includes verifying that the media file is in at least one correct format. Furthermore in this embodiment, the media package is generated only if the at least one correct format of the media file is verified. The at least one correct format may include information such as aspect ratio data and verification that video and audio data are present in the media file. One aspect provides further checks for a minimum level of video and/or audio quality of the source media file beyond a simple minimum bit-rate. The verifying may further include a checksum validation wherein the checksum validation validates the media file if it meets expected dynamically generated checksums from the on-line downloading store. Various other validation methods may be used as well as will be appreciated by one of ordinary skill in the art.

Another aspect further includes generating dynamic feedback wherein the dynamic feedback indicates any errors sent from the on-line downloading store and prevents generating the media package if there are any errors. Additionally, the system can include the dynamic feedback indicating an error if the submitted user credential data and vendor identification data are not approved for the media file.

Other embodiments may include storing the media package for each at least one compression job at a location defined by the destination data. In this embodiment the media package is generated based on the received setting data, the pre-defined asset metadata, and the received contract acceptance data and is configured for ingestion into the on-line downloading store. This embodiment may further include retrieving the media package from the location and transmitting the media package to a transporter module for ingestion into the on-line downloading store. In one embodiment the location is local to the user submitting the media file.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A "tangible" computer-readable medium expressly excludes software per se (not stored on a tangible medium) and a wireless, air interface. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method of ingesting media into a server, the method comprising:
receiving a media file from a device associated with a first user into a compressor application in which at least one compression job is assigned for the media file;
receiving, from the device associated with the first user, setting data and target data for the media file; and
upon retrieving contract acceptance data from a database based on a pre-existing contract associated with the media file, generating, via a processor, a media package configured for ingesting into the server for each of the at least one compression job assigned to the media file according to the setting data and target data.

2. The method of claim 1, further comprising storing the media package for each at least one compression job at a location defined by the target data, the media package being generated based on the received setting data, the predefined asset metadata, and the received contract acceptance data and configured for ingesting into the server.

3. The method of claim 2, further comprising retrieving the media package from the location and transmitting the media package to a transporter module for ingestion into the server.

4. The method of claim 1, wherein the setting data comprises at least one of: XML information, chapter information, chapter heading information, chapter break information, and pricing information.

5. The method of claim 1, further comprising verifying that the media file is in at least one correct format.

6. The method of claim 1, further comprising generating the media package only if the at least one correct format of the media file is verified.

7. The method of claim 5, wherein the at least one correct format includes one of aspect ratio data and verification that video and audio data are present in the media file.

8. The method of claim 5, wherein verifying that the media file is in at least one correct format is based on a checksum validation based on whether the media file meets expected dynamically generated checksums from the server.

9. The method of claim 1, further comprising generating dynamic feedback wherein the dynamic feedback indicates errors sent from the server and prevents generating the media package based on the errors.

10. The method of claim 9, wherein the dynamic feedback indicates an error if the submitted user credential data and vendor identification data are not approved for the media file.

11. The method of claim 3, wherein the transporter module ingests the generated media package into the server automatically upon generating the media package.

12. The method of claim 1, wherein a location of the media file is local to the first user submitting the media file.

13. A system for ingesting media into a server, the system comprising:
a processor; and
a memory comprising computer-readable instructions which when executed by the processor cause the processor to perform steps comprising:
receiving a media file from a first user into a compressor application in which at least one compression job is assigned for the media file;
receiving setting data and target data for the media file; and
generating a media package configured for ingesting into the server according to the setting data and target data for each of the at least one compression job assigned to the media file, upon receiving contract acceptance data from a database based on a pre-existing contract associated with the media file.

14. The system of claim 13, wherein the computer-readable instructions further cause the processor to perform steps comprising:
retrieving the media package from the location and transmitting the media package to a transporter module for ingestion into the server.

15. The system of claim 13, wherein the setting data comprises at least one of: XML information, chapter information, chapter heading information, chapter break information, and pricing information.

16. The system of claim 13, wherein the computer-readable instructions further cause the processor to perform steps comprising: verifying that the media file is in at least one correct format.

17. The system of claim 16, wherein the computer-readable instructions further cause the processor to perform steps comprising: generating the media package only when the at least one correct format of the media file is verified.

18. The system of claim 17, wherein the at least one correct format includes one of aspect ratio data and verification that video and audio data are present in the media file.

19. The system of claim 17, wherein verifying that the media file is in at least one correct format is based on a checksum validation based on whether the media file meets expected dynamically generated checksums from the server.

20. A non-transitory computer-readable storage medium storing instructions which, when executed by a computing device, cause the computing device to ingest media into a server, the instructions comprising:
receiving a media file from a first user into a compressor application in which at least one compression job is assigned for the media file;
receiving setting data and target data for the media file; and
upon receiving contract acceptance data from a database based on a pre-existing contract associated with the media file, generating a media package configured for ingesting into the server for each of the at least one compression job assigned to the media file according to the setting data and target data.

* * * * *